US009783271B2

United States Patent
Foss et al.

(10) Patent No.: US 9,783,271 B2
(45) Date of Patent: Oct. 10, 2017

(54) FLIPPING CONVERSION SEAT AND LEAN POST

(71) Applicants: Charles Dean Foss, New Smyrna Beach, FL (US); Daniel Patrick Daily, Lake Mary, FL (US)

(72) Inventors: Charles Dean Foss, New Smyrna Beach, FL (US); Daniel Patrick Daily, Lake Mary, FL (US)

(73) Assignee: Boston Whaler, Inc., Edgewater, FL (US)

( * ) Notice: Subject to any disclaimer, the term of this patent is extended or adjusted under 35 U.S.C. 154(b) by 57 days.

(21) Appl. No.: 14/604,314

(22) Filed: Jan. 23, 2015

(65) Prior Publication Data

US 2016/0214689 A1    Jul. 28, 2016

(51) Int. Cl.
*B63B 29/04* (2006.01)
*B60N 2/02* (2006.01)

(52) U.S. Cl.
CPC ............... *B63B 29/04* (2013.01); *B60N 2/02* (2013.01); *B63B 2029/043* (2013.01)

(58) Field of Classification Search
CPC ................................. B63B 29/04; B60N 2/02
USPC ...................................................... 297/344.1
See application file for complete search history.

(56) References Cited

U.S. PATENT DOCUMENTS

| 5,195,795 A | 3/1993 | Cannera et al. |
| 5,328,239 A | 7/1994 | Yamazaki |
| 7,252,336 B2 | 8/2007 | Frisina |
| 7,341,018 B2 | 3/2008 | Greenberg |
| 7,416,238 B2 * | 8/2008 | Houston ............... B60N 2/3065 296/66 |
| 7,422,279 B2 | 9/2008 | Kushner et al. |
| 7,647,880 B2 | 1/2010 | Devine |
| 7,661,382 B2 | 2/2010 | Wood et al. |
| 8,038,206 B2 | 10/2011 | Ito et al. |
| 8,376,443 B2 | 2/2013 | Kemp et al. |

* cited by examiner

*Primary Examiner* — Anthony D Barfield
(74) *Attorney, Agent, or Firm* — Malin Haley DiMaggio & Bowen, P.A.

(57) ABSTRACT

A conversion seat for a marine vessel that converts from a lean post configuration to a seat configuration. In a stowed position, the seat is stored vertically exposing a cushion that can be used as a lean post. When a positive lock is released the seat is able to rotate, in some embodiments with an assist from a gas strut, two-hundred and seventy (270) degrees until the seat lands on a horizontal surface. When released, a backrest opens to a desired angle providing a comfortable seat or sun pad. To stow the seat for use as a lean post, the backrest is folded back down and then the seat is able to rotate back through the two-hundred and seventy (270) degrees to its vertical stowed position.

10 Claims, 6 Drawing Sheets

FLIPPING CONVERSION SEAT AND LEAN POST

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

1. Field of the Invention

The present invention generally relates to marine vessels and more particularly to a flipping conversion seat and lean post apparatus for marine vessels.

2. Description of Related Art

Comfort and usability are critical factors in marine vessel and boat design, particularly when designing sport fishing boats and other small craft where deck space is at a minimum. Common to center-console open fisherman style boats are leaning posts which provide boat operators and boaters a substantially vertical support on which to comfortably lean during operation of the vessel. Leaning posts are particularly useful due to the dynamic nature of open fisherman boats wherein generally standing will provide more stability for the boater than a traditional sitting position. Nonetheless, when such an open fisherman boat is stopped, drifting, or even trolling, a boater may desire to be in a seated position for additional comfort. Moreover, because such boats are multi-purpose and will often be used for various recreational activities, boaters may desire to have a sun-pad in order to lay down comfortably for extended periods of time.

Because available space is always at a premium, it is often desirable to provide seating and comfort features that have multiple positions and are otherwise multi-purpose. Moreover, the ability to store seating in a manner that clears deck space is often desirable in order to improve the usability and flexibility of a boat. Several attempts have been made to provide versatile seating for open fisherman style boats, however none are particularly elegant or provide a complete compliment of possible seating or leaning positions.

For example, U.S. Pat. No. 7,819,483 to Kushner et al. describes a combination leaning post storage compartment comprising a seat assembly having a D-ring a cross tube disposed in the D-ring defining a rectangular boundary. Two side frames are removable attached at opposite ends of the D-ring and a crossbar is attached between the side frames. A seat cushion is pivotably attached to the crossbar and a soft-sided storage compartment is removably attached to the rectangular boundary. The storage compartment is accessible by pivoting the seat cushion.

U.S. Pat. No. 7,647,880 to Devine describes an adjustable boat leaning post mounting systems that comprises a pair of side-by-side seat posts on which a leaning post can be adjustably mounted. The space between the support posts can be adjusted to accommodate various seating configurations including a leaning post and separate seats.

U.S. Pat. No. 7,252,336 to Frisina describes a pivotable boat seat having a seat cushion and a squab with the seat being adjustable between a first seating configuration and a second leaning configuration, wherein in the second configuration the squab is positioned forward of its first position and substantially above the forward most position on the seat cushion. Two tubular members attached the squab to the seat on either side and provide a pivot point for the squab to articulate relative to the seat cushion.

U.S. Pat. No. 7,341,018 to Greenberg et al. discloses a retractable deck mounted rumble seat wherein a deck has an opening in which a pivotable seat is located. The back of the seat forms a hatch closing the opening in the deck section. A hydraulic actuating system under electrical control is provided to pivot the seat between an open and a close position.

Although the prior art provides some solutions to existing problems, none provide a solution It is, therefore, to the effective resolution of the aforementioned problems and shortcomings of the prior art that the present invention is directed. However, in view of the seats, lean posts, and loungers in existence at the time of the present invention, it was not obvious to those persons of ordinary skill in the pertinent art as to how the identified needs could be fulfilled in an advantageous manner.

SUMMARY OF THE INVENTION

The present invention comprises a conversion seat for a marine vessel that converts from a lean post configuration to a seat. In a stowed position, the seat is stored vertically exposing a cushion that can be used as a lean post pad. When a positive lock is released the backrest and seat cushion are able to rotate, in some embodiments with an assist from a gas strut, two-hundred and seventy (270) degrees until the seat lands on a horizontal surface. When released, the backrest opens to a desired angle providing a comfortable seat or sun pad. To stow the seat, a locking mechanism on the backrest is released to lower the backrest and then the seat is able to rotate back through the two-hundred and seventy (270) degrees to its stowed position.

More specifically, disclosed is a conversion seat configurable between a stowed position and a deployed position. The seat comprises at least a seat cushion that is pivotably attached to a console by at least one dual-axis hinge that permits the conversion of the seat from a lean post to a traditional seating surface. The dual-axis hinge permits at least two-hundred and seventy degrees of rotation of the seat cushion with respect to the console about a first pivot axis of each of the hinge. In some embodiments, a backrest may be pivotably attached to the seat cushion. In the stowed position, the backrest is folded over parallel with the seat cushion and the seat is placed in a vertical position providing an exposed lean post. In some embodiments, a locking pin is disposed on the console and engages a receiving bracket on the seat in order to releasably retain the seat when in the stowed position. In the deployed position, the seat is rotated substantially two-hundred and seventy degrees from said stowed position into a horizontal position and, with the backrest rotated up from the seat cushion, the seat provides a seating surface. The dual-axis hinge permits a one-hundred and eighty degree range of motion of the backrest with respect to the cushion about a second pivot axis of each of the hinge. This allows the backrest to be adjusted relative to the seat cushion for a variety of seating positions, including a flat sunpad (one hundred and eighty degree condition).

In some embodiments, the seat employs two dual-axis hinges, one on either side of the seat and attached to the console. The dual-axis hinges comprise a seat cushion bracket attached to the seat cushion, a backrest bracket attached to the backrest, and a console bracket attached to the console. The console bracket is attached to the seat cushion bracket at the first pivot axis and the seat cushion bracket is attached to the backrest bracket at the second pivot axis. In some cases, the dual-axis hinges are assisted by a gas strut attached between the console and the hinges.

Accordingly, it is an object of the present invention to provide an improved conversion seat that is operable between a stowed position and a deployed position wherein the stowed position provides lean post functionality and the deployed position provides a traditional seating surface functionality.

It is another object of the present invention to provide a seating system for marine vessel that provides a plurality of seating options while minimizing footprint and maximizing on board usable space.

In accordance with these and other objects which will become apparent hereinafter, the instant invention will now be described with particular reference to the accompanying drawings.

DETAILED DESCRIPTION

Figure 1:
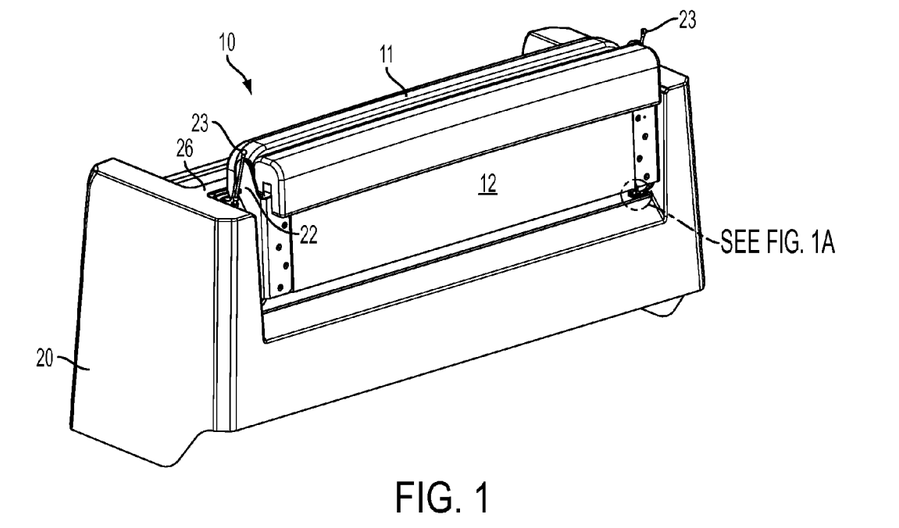
FIG. 1 is a perspective view of one embodiment of the conversion seat of the present invention, in a stowed position functioning as a lean post.
Figure 2:
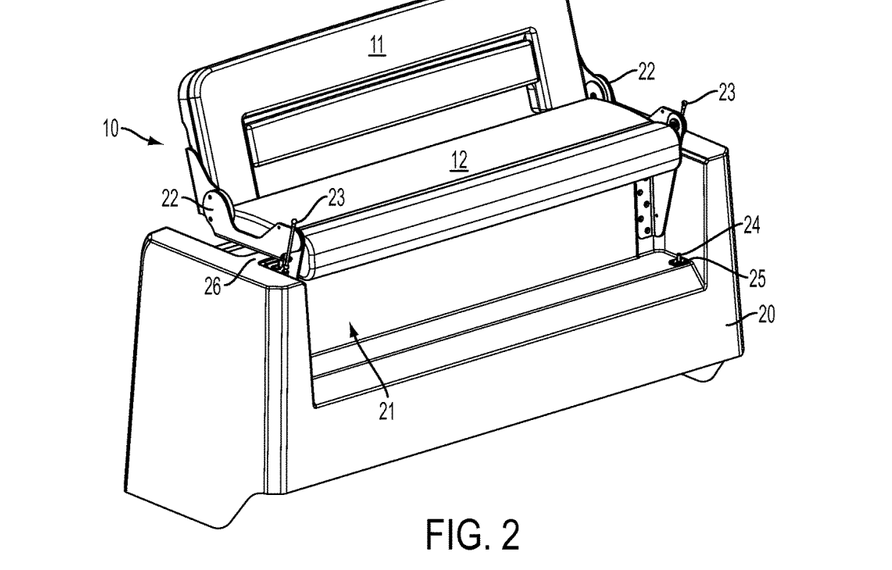
FIG. 2 is a perspective view of one embodiment of the conversion seat of the present invention, in a deployed position functioning as a seat.

With reference to FIGS. 1 and 2, shown is conversion seat 10 (hereinafter referred to as "seat"), in a deployed position, pivotably attached to a console 20. Seat console 20 may disposed, for example, on an exemplary marine vessel such as an open fisherman style boat or any other boat configuration where it is desirable to have a combination leaning post, seat, and sun pad as will be made apparent by the following description. Seat 10 comprises a backrest 11 and a seat cushion 12. Seat 10 is accommodated by a recess 21 of console 20. In some embodiments, recess 21 is dimensioned to enclose seat 10 when the seat 10 is in a stowed position, as shown in FIG. 1. Seat 10 is attached to seat console 20 by bi-lateral dual-axis hinges 22 which are attached on either side of the seat 10. The action of the dual-axis hinges 22 are assisted by gas struts 23. In some embodiments, the backrest 11 is optional and may be omitted although comfort may be compromised.

Figure 1A:
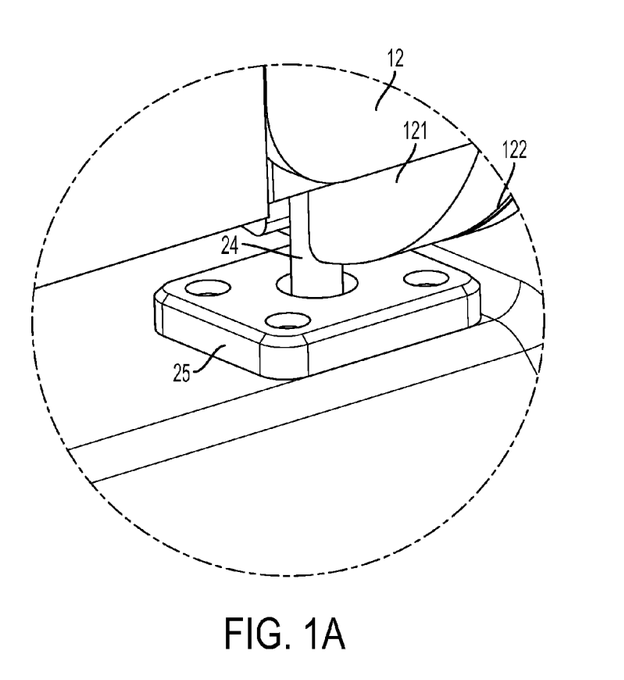
FIG. 1A is an up-close view of one embodiment of the locking pin engagement used to secure the conversion seat.

FIGS. 1 and 2 demonstrate the two primary operable position of the seat 10 of the present invention. In a stowed position, shown FIG. 1, seat 10 is in a stowed position with backrest 11 folded over onto seat cushion 12. The entire seat 10, including backrest 11 and seat cushion 12, is in a substantially vertical position such that the seat 10 functions as a lean post, with a user able to lean against seat cushion 12. In some embodiments, seat 10 is at least partially disposed in recess 21 of console 20. The lean post position is favorable for either a forward or rear facing standing position (relative to the orientation of the vessel on which the seat 10 is installed), providing enhanced comfort and stability for a standing boater. Referring to FIG. 1A, in some embodiments, in the stowed position seat 10 is releasably retained by locking pin 24 attached to the console 20. In some embodiments, the locking pin 24 is attached to the bottom of recess 21 by a bracket 25. The locking in 24 is configured to engage a receiving bracket 121 attached to seat cushion 12. In some embodiments the receiving bracket 121 has a locking channel 21 that lockingly receives the locking pin 24. The locking arrangement of the seat 10 allows seat 10 to remain secured to console 20 when in the stowed position, eliminating any unwanted movement or repositioning of the seat 10 when in use as a lean post.

In a deployed position, shown in FIG. 2, seat 10 is rotated about hinges 22 two-hundred and seventy (270) degrees from the stowed lean post position such that seat cushion 12 is in a substantially horizontal position. In some embodiments, seat cushion 12 comes to rest against and is vertically supported by console 20. As shown in FIG. 2, in some embodiments, seat cushion 12 rests against an upper support member 26 of console 20. In some embodiments, backrest 11 may be hinged upward about hinges 22 relative to seat cushion 12 and may be selectively placed in a substantially vertical or angled position depending on the desired comfort level. In some embodiments, the backrest 11 can be hinged to a position one hundred and eighty (180) degrees relative to the seat cushion 12 such that a flat sunpad is provided. In the second position, seat 10 deploys into a traditional seat configuration providing both bottom and back support for the user.

Figure 3:
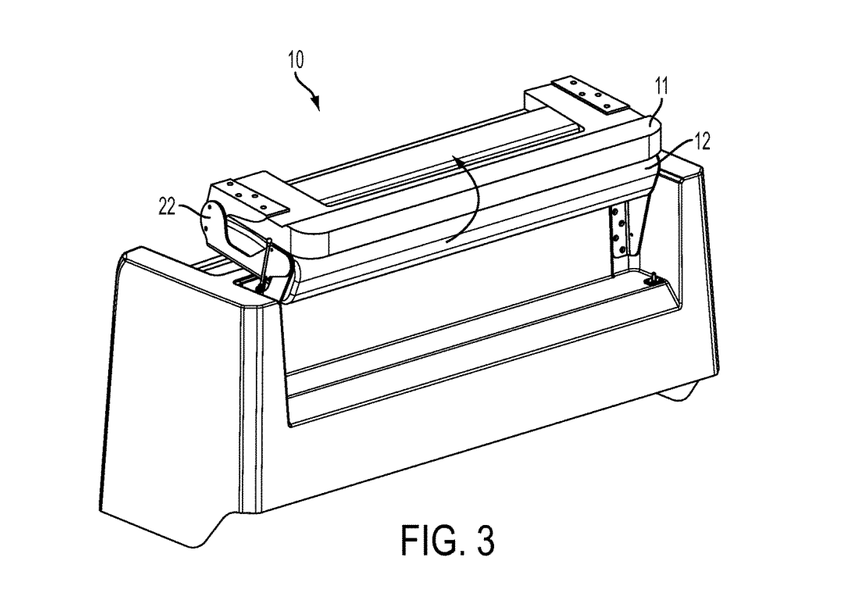
FIG. 3 is a perspective view of one embodiment of the conversion seat of the present invention, in an intermediate position between the stowed position and deployed position.
Figure 4A:
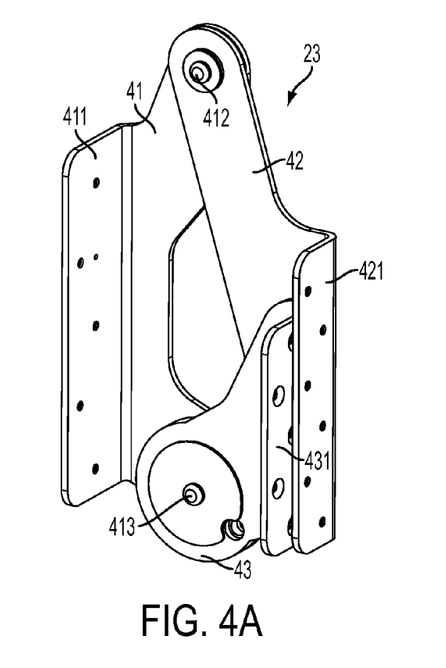
FIG. 4A is a perspective view of one embodiment of the hinge component of the present invention, in a stowed position.

To better understand the flipping conversion action of the present invention, FIG. 3 depicts the seat 10 in an intermediation position between the stowed (lean post) position and the deployed (seat) position described above. The selectable "flipping" and rotation conversion action of seat 10 is facilitated by bi-lateral dual-axis hinges 22 which are shown in detail and constituent components in FIGS. 4A-4E. FIG. 4A shows a hinge 22 in the stowed position. The hinge 22 comprises three interconnected components including seat cushion bracket 41, console bracket 42, and backrest bracket 43. Seat cushion bracket 41 includes a perpendicular seat cushion flange 411 which attaches to seat cushion 12 of seat 10. The seat cushion bracket 41 includes two opposing and spaced apart tongues 414 and 415 that provide attachment locations for the other hinge components. With reference to FIGS. 4A and 4C together, console bracket 42 includes a perpendicular console flange 421 that attaches to console 20, and a tongue 422. As such, console flange 421 defines the fixed point of the hinge 22 in that it is secured to the fixed console 20 about which the seat 10 articulates. Tongue 422 is pivotably attached to seat cushion bracket 41 at tongue 415 thereof, which assembles to define a first pivot axis 412. Backrest bracket 43 includes a perpendicular backrest flange 431 that attaches to backrest 11, and a tongue 432. Tongue 432 is pivotably attached to seat cushion bracket 41 at tongue 414 thereof, which assembles to define a second pivot axis 413.

Figure 4B:
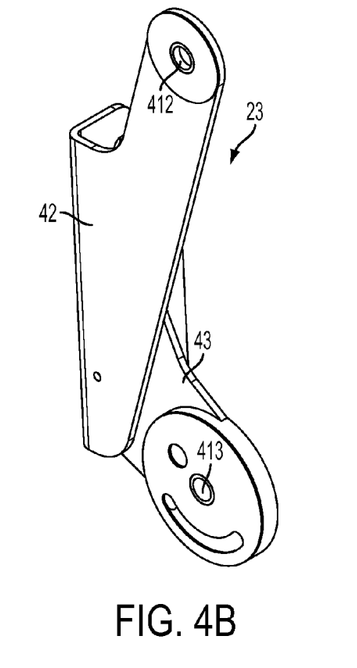
FIG. 4B is a perspective view of one embodiment of the hinge component of the present invention, with a bracket element removed.
Figure 4C:
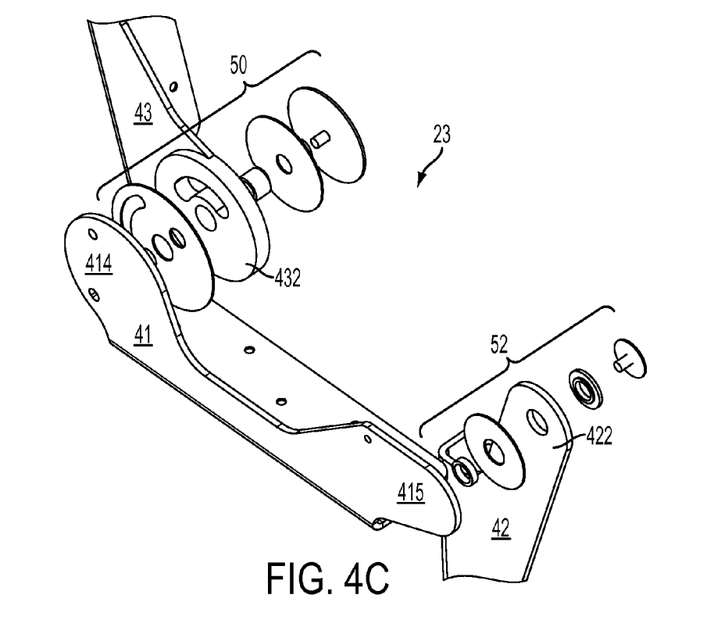
FIG. 4C is a perspective view of one embodiment of the hinge component of the present invention, in a deployed position.
Figure 4D:
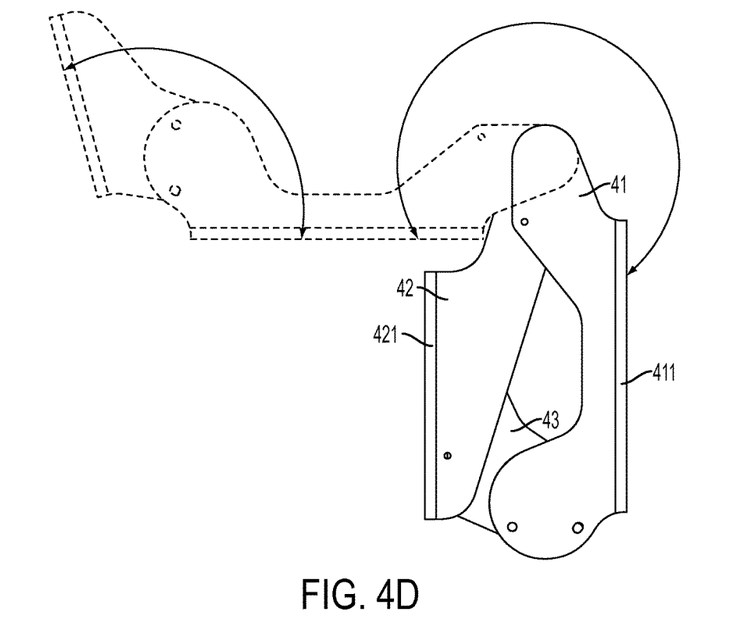
FIG. 4D is a side view of one embodiment of the hinge component of the present invention, in a stowed position.
Figure 4E:
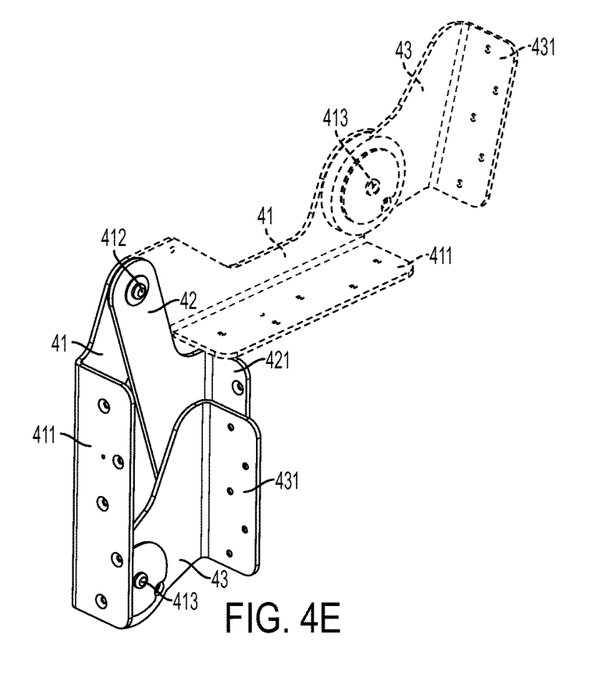
FIG. 4E is an alternative perspective view of the hinge component of the present invention.

FIG. 4B shows the hinge 22 with seat cushion bracket 41 removed and more clearly showing tongues 422 and 432 having pivot axes 412 and 413. With reference again to FIG. 4C, which shows hinge 22 in a deployed position, shown are two bracket fasteners 50 and 52 which comprise the hardware attaching the respective tongues of the hinge 22 to form the first and second pivot axes 412 and 413. FIG. 4D is a side view of hinge 22 and FIG. 4E is another perspective view showing the orientation of the hinge 22 in the stowed position in solid lines, and the deployed position in dotted lines. In FIGS. 4D and 4E it is again shown and it is understood that console 42 is the fixed portion of the hinge about which the other two brackets, namely seat cushion bracket 41 and backrest bracket 43 articulate. As such, hinge 22 is configured such that the seat cushion bracket 41 and backrest bracket 43 both rotate in unison with respect to console bracket 42 about pivot axis 412 and backrest bracket 43 rotates with respect to seat cushion bracket 41 about pivot axis 413.

This dual-axis hinging action allows the seat 10 to be easily "flipped" or converted from its first stowed position to its second deployed position and moreover permits the backrest 11 to pivot relative to seat cushion 12 to allow for various seating positions, including a flat sun pad position. More specifically, to move from the deployed position from the stowed position, force is applied to seat cushion 12 such that bracket 41 rotates two-hundred and seventy (270) degrees around pivot axis 412, which causes seat cushion 12 to move from a substantially vertical condition to a substantially horizontal condition. Then, backrest 11 can be manipulated such that backrest bracket 43 rotates around pivot axis 413 to desired seating position. Referring back to FIGS. 1-2, in some embodiments, gas struts 23 may be attached between the console bracket 42 and the seat cushion bracket 41 to assist the user in moving the seat 10 between its various positions. The struts help to minimize the effort needed to deploy and retract the seat. It is appreciated that strut 23 can be substituted with various other similar acting struts including hydraulic and electronic strut means.

Figure 5A:
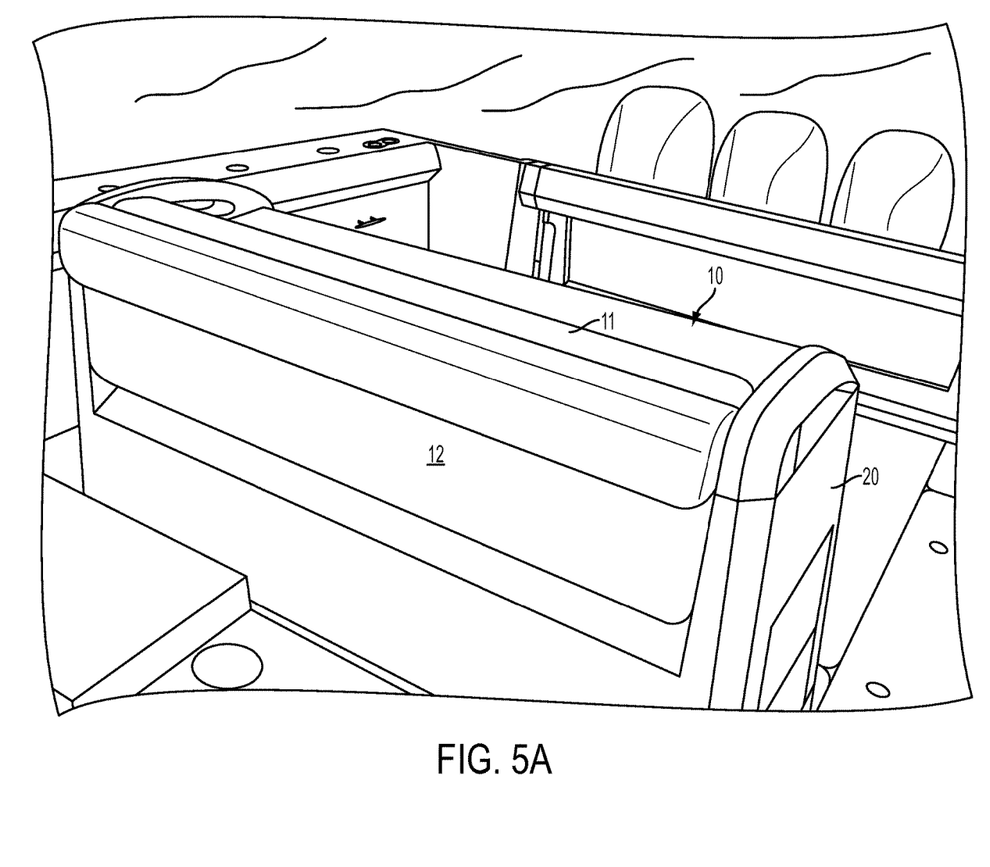
FIG. 5A depicts another embodiment of the conversion seat of the present invention installed on an exemplary vessel, in a stowed position.
Figure 5B:
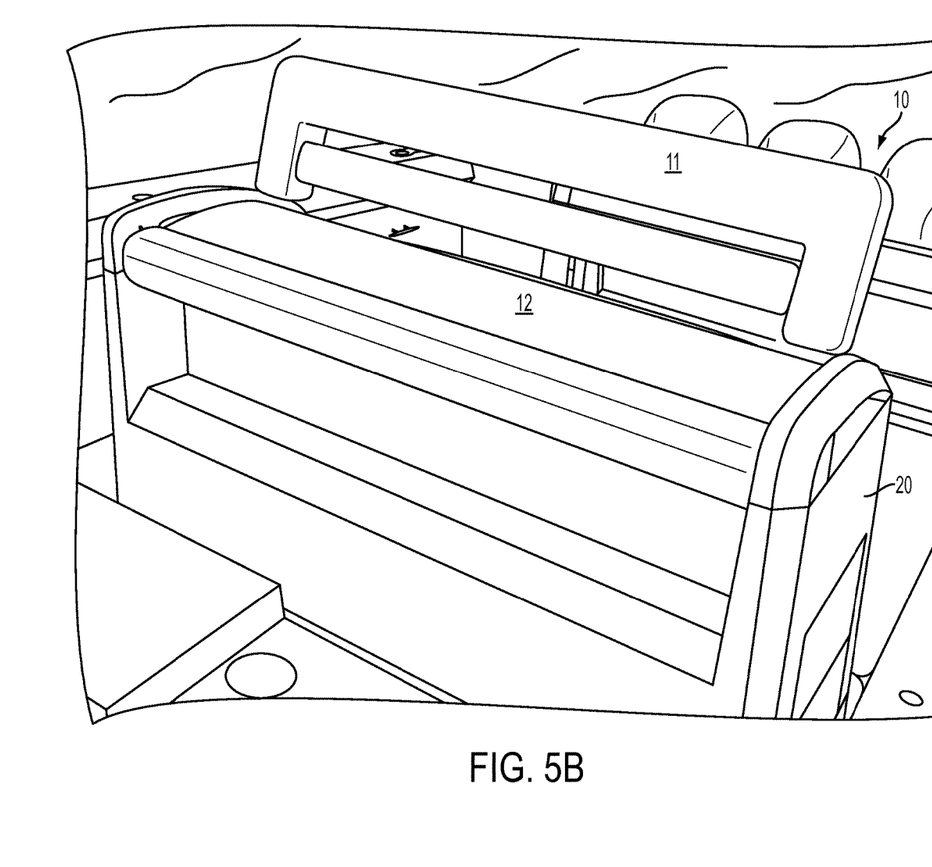
FIG. 5B depicts another embodiment of the conversion seat of the present invention installed on an exemplary vessel, in a deployed position.

FIGS. 5A and 5B depict an embodiment of the present invention as installed on an exemplary open fisherman style vessel 50. Here, the console 20 and seat 10 are installed at or about the center control console 51 of the vessel 20. In the stowed position (FIG. 5A), the seat 10 functions as a comfortable leaning post for standing boaters and is particularly useful during high speed operation or rough seas where standing provides better stability for boaters. In FIG. 5B, the seat 10 has been converted to the deployed position, providing a comfortable bench-style seat with support for both the bottom and back of the users.

It is appreciated that the seat 10 of the present invention can be adapted for a variety of uses and need not be limited to marine applications. In any event, in the context of marine installations, the present invention provides a substantial advantage of the prior art in that it provides multiple seating configurations while minimizing overall footprint. It is further appreciated and understood that the components of the present invention can be comprised of a variety of materials including metals, plastics, fiberglass resins, foams, vinyl materials, and other suitable materials.

The instant invention has been shown and described herein in what is considered to be the most practical and preferred embodiments. It is recognized, however, that departures may be made therefrom within the scope of the invention and that obvious modifications will occur to a person skilled in the art.

What is claimed is:

1. A conversion seat and lean post for boats configurable between a stowed position and a deployed position, comprising:
    a seat cushion;
    said seat being disposed in and pivotably attached to a console;
    said seat being pivotably attached to said console by at least one dual-axis hinge, said hinge having a first pivot axis and a second pivot axis, said hinge permitting at least two-hundred and seventy degrees of rotation of said seat cushion with respect to said console about a first pivot axis;
    wherein in said stowed position, said seat cushion is in a vertical position providing an exposed lean post; and
    wherein in said deployed position, said seat cushion is rotated substantially two-hundred and seventy degrees from said stowed position into a horizontal position providing a seating surface.

2. The conversion seat of claim 1, wherein said seat is releasably engaged with said console.

3. The conversion seat of claim 1, further comprising a backrest pivotably attached to said seat cushion, said dual-axis hinge permitting at least one-hundred and eighty degrees of rotation of said backrest with respect to said seat cushion about a second pivot axis of said hinge.

4. The conversion seat of claim 1, wherein said dual-axis hinge is assisted by a gas strut.

5. A conversion seat configurable between a stowed position and a deployed position, comprising:
    a backrest and a seat cushion;
    wherein said seat is pivotably attached to a console by bi-lateral dual-axis hinges;
    each of said dual-axis hinges permitting at least two-hundred and seventy degrees of rotation of said seat cushion with respect to said console about a first pivot axis of each of said hinges;
    said dual-axis hinges further permitting at least one-hundred and eighty degrees of rotation of said backrest with respect to said seat cushion about a second pivot axis of each of said hinges;
    wherein in said stowed position, at least said seat cushion is in a vertical position providing an exposed lean paid; and
    wherein in said deployed position, said seat cushion is rotated substantially two-hundred and seventy degrees from said stowed position into a horizontal position providing a seating surface.

6. The conversion seat of claim 5, wherein each of said dual-axis hinges comprise a seat cushion bracket attached to said seat cushion, a backrest bracket attached to said backrest, and a console bracket attached to said console.

7. The conversion seat of claim 6, wherein said console bracket is attached to said seat cushion bracket at said first pivot axis.

8. The conversion seat of claim 7, wherein said seat cushion bracket is attached to said backrest bracket at said second pivot axis.

9. The conversion seat of claim 5, wherein each of said dual-axis hinges are assisted by a gas strut attached between said console and said dual-axis hinges.

10. A conversion seat configurable between a stowed position and a deployed position, comprising, comprising:
    a seat cushion and a backrest;

wherein in said stowed position, said seat is in a vertical position providing an exposed lean post;

wherein in said deployed position, said seat is rotated substantially two-hundred and seventy degrees from said stowed position into a horizontal position providing a seating surface; and wherein said backrest is pivotably attached to said seat cushion and, in said deployed position, is adjustable through a one hundred and eighty degree range of motion with respect to said seat cushion.

* * * * *